(12) United States Patent
Martinez

(10) Patent No.: US 9,867,452 B1
(45) Date of Patent: Jan. 16, 2018

(54) OUTDOOR LOUNGE SLING SEAT

(71) Applicant: Gilbert Alan Martinez, Dallas, TX (US)

(72) Inventor: Gilbert Alan Martinez, Dallas, TX (US)

( * ) Notice: Subject to any disclaimer, the term of this patent is extended or adjusted under 35 U.S.C. 154(b) by 0 days.

(21) Appl. No.: 15/227,937

(22) Filed: Aug. 3, 2016

(51) Int. Cl.
| A45F 3/26 | (2006.01) |
| A47C 1/14 | (2006.01) |
| A47C 7/62 | (2006.01) |
| A47C 7/50 | (2006.01) |
| A47C 4/28 | (2006.01) |
| A01M 31/02 | (2006.01) |

(52) U.S. Cl.
CPC ............... *A45F 3/26* (2013.01); *A01M 31/02* (2013.01); *A47C 1/146* (2013.01); *A47C 4/28* (2013.01); *A47C 7/506* (2013.01); *A47C 7/62* (2013.01)

(58) Field of Classification Search
USPC .......................................................... 297/280
See application file for complete search history.

(56) References Cited

U.S. PATENT DOCUMENTS

| 1,288,397 | A | * | 12/1918 | Eberle | A47D 13/105 |
| | | | | | 297/274 |
| 1,339,296 | A | * | 5/1920 | Sparks | A47C 3/0255 |
| | | | | | 297/278 |
| 2,549,679 | A | | 4/1951 | Foote | |
| 2,851,085 | A | | 9/1958 | Woodward | |
| 3,358,789 | A | | 12/1967 | Laum | |
| 3,493,080 | A | | 2/1970 | Ehlert | |
| 4,113,057 | A | | 9/1978 | Bessinger | |
| 4,221,429 | A | * | 9/1980 | Wade | A45F 3/26 |
| | | | | | 297/184.15 |
| 4,347,914 | A | * | 9/1982 | Gary | A01M 31/02 |
| | | | | | 182/142 |
| 4,351,524 | A | * | 9/1982 | Gomes | A47C 3/0255 |
| | | | | | 248/188 |
| 4,600,081 | A | | 7/1986 | Wade | |
| 4,727,961 | A | | 3/1988 | Dawson | |
| 4,730,699 | A | | 3/1988 | Threlkeld | |
| 5,415,455 | A | * | 5/1995 | Geldbaugh | A47C 4/02 |
| | | | | | 297/16.2 |
| 5,862,883 | A | | 1/1999 | Carriere | |
| 6,582,018 | B2 | * | 6/2003 | Tseng | A47C 3/0255 |
| | | | | | 297/273 |

(Continued)

FOREIGN PATENT DOCUMENTS

WO    WO-2012164359 A1 * 12/2012 ........... A47C 3/0255

*Primary Examiner* — David E Allred

(57) ABSTRACT

Elevated, folding, collapsable, light weight outdoor lounge chair for hunters, fisherman, campers, hikers, rock climbers, photographers, bird watchers and all outdoor activities including back yard BBQs, The sling type lounge chair is adaptable to almost any natural structure with independent lines for leveling left to right and front to back with a more reclined option available. The product can be easily carried in a 5"×24" pouch and installed in less than ten minutes quietly and stealthily. Installation is easily applied to any natural tree branch formations where competitive products are limited to more uniform structure, this product can be applied to all locations of given branch formations including the trunk elevation, forks, outlying horizontal branches and even treetops provided weight capacity of the natural structure is not exceeded.

20 Claims, 3 Drawing Sheets

(56) References Cited

U.S. PATENT DOCUMENTS

Figure 1:
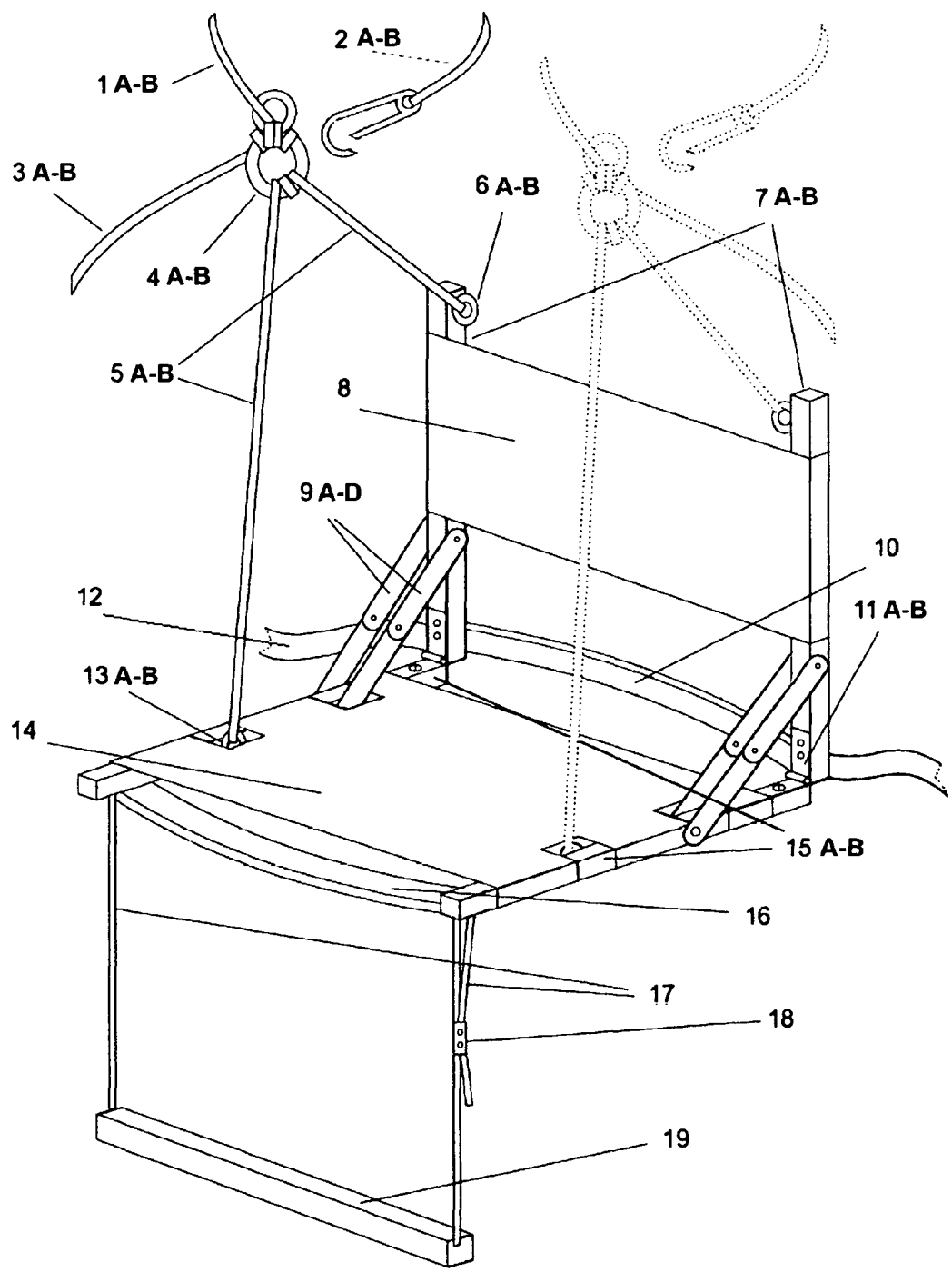

| | | | |
|---|---|---|---|
| 6,739,662 B1 * | 5/2004 | Alvarez | A47C 3/0255 297/279 |
| 7,090,050 B1 * | 8/2006 | Hedgepeth | A01M 31/02 182/142 |
| 8,230,972 B2 | 7/2012 | Johnson | |
| 8,414,072 B2 * | 4/2013 | Phillips | A01M 31/02 297/273 |
| 2006/0207833 A1 | 9/2006 | Kessinger | |
| 2008/0156586 A1 | 7/2008 | Pestrue | |
| 2011/0241397 A1 * | 10/2011 | Spencer | A01M 31/02 297/273 |
| 2011/0308887 A1 | 12/2011 | Johnson | |

* cited by examiner

OUTDOOR LOUNGE SLING SEAT

BACKGROUND OF THE INVENTION

(1) Field of the Invention

The invention relates to elevated, folding, collapsable, light weight outdoor lounge chair for hunters, fishermen, campers, hikers, rock climbers, photographers, bird watchers and all outdoor activities including back yard BBQs.

(2) Description of Related Art Including Information Disclosed Under 37 CFR 1.97 and 1.98

U.S. Pat. No. 4,730,699 March 1988 Threlkeld
U.S. Pat. No. 5,862,883 January 1999 Carriere
U.S. Pat. No. 8,230,972 July 2012 Johnson
2006/0207833 September 2006 Kessinger
2008/0156586 July 2008 Pestrue
U.S. Pat. No. 3,493,080 February 1970 Ehlert
U.S. Pat. No. 2,549,679 April 1951 Foote
U.S. Pat. No. 4,600,081 July 1986 Wade
U.S. Pat. No. 4,113,057 September 1978 Bessinger
2011/0308887 December 2011 Johnson
U.S. Pat. No. 3,358,789 December 1967 Laum
U.S. Pat. No. 2,851,085 September 1958 Woodward The Outdoor Lounge Sling Seat allows for diverse installation at any part of a secure tree structure and is not limited to branchless lanky, slender trunks as the majority of North American trees have lateral branches much too close to the ground for typical elevated stands or seats and need to be cleared. This invention is unique in it's ability to adapt to even horizontal structure and is not limited to vertical support. While sling type seats and deer stands: Woodward—U.S. Pat. No. 2,851,085, Foote—U.S. Pat. No. 2,549,679, McClung—U.S. Pat. No. 4,069,891 and Wade—U.S. Pat. No. 4,600,081, are either far less sophisticated or far more cumbersome, some needing to be installed days or weeks prior to use, this invention finds the niche of comfort, portability and more diverse application. Time involved for installation and stealth exceeding the majority in at least some or all afore mentioned categories. Working prototype field tested Thursday, Jun. 27, 2013 at 10:57 AM. Extensive photo log of assembly, installation and use with 185 pound male suspended at ground level as well as at a height of about 14 feet, witnesses present. Provisional patents: U.S. 62/282,073, U.S. 61/959,515, U.S. 61/999,962 are preliminary non provisional designs void of minor improvements listed and illustrated in this application.

A Lightweight foldable elevated outdoor tree lounge seat comprised of dual "L" shaped frames with locking hinges allowing L-frame to be folded together to a parallel posture upon dismantle includes; flexible seating mesh fabric attached to L-frames wherein said L-Frame is equipped with suspension lines permanently attached to L-frames, permanent brace bars initially at a position parallel to said L-frames, braces swivel to a perpendicular location to attach to opposing L-frames left and right at two isolated strategic locations; slightly curved arched brace bars for seating comfort are ideally located to suspend both vertical partition and horizontal partition of said L-frame to parallel perspective throughout; securement of brace to L-frame utilizes simple slide lock and secures said L-frames to a comfortable 22" width accommodating seating dimensions, mesh fabric is now stretched and taunt to form seat and backrest.

The outdoor lounge seat is equipped with locking hinges secure 90 degree angles of said L Frames distributing one leg of frame at a vertical position while the alternate leg is now horizontal; assembled "L" shaped seat is equipped with permanent nylon fiber marine line attached to both vertical and horizontal frame units left and right, nylon Marine Line is permanently attached via "eye bolt" to L-frame vertical and L-frame horizontal, Nylon marine line forming an inverted "V" is suspended above line of sight of the occupant by "Figure 8" climbing ring device allowing pivot point adjustment to seating pitch for comfort; metal tubing foot rest permanently attached to horizontal leg of said L-frame via a sash is now positioned in a lateral position below and parallel to a horizontal seat plane. A sash cord specific to a foot rest allows for height adjustment via a manual crimp mechanism which can be adjusted to suitable user height.

The lounge seat includes a carabiner clip with independent 16 ft. nylon marine lines which are available to be looped around any natural structure at any height then returned and clipped to the figure "8" ring; return line or slack marine line is then available to be woven and secured within the figure 8 climbing rings safely while a level posture is mirrored on the opposing side of said lounge seat; any and all excess line referenced in is easily coiled and/or stowed behind the back rest out of the way of the occupant, seat belt can now be secured around occupant with traditional design not intrusive and not completely relevant to invention design.

BRIEF SUMMARY OF THE INVENTION

The present invention is a elevated lounge seat invention competes with massive far more expensive tree stands, ladder stands, permanent elevated hunting platforms and tripod boxes as well as sling seats limited to vertical natural structure applications. Traditional tree stands are limited for the most part to the main vertical structure or trunk of larger slender trees. This durable weather proof design allows for multiple locations on any given natural tree formation, is far more comfortable than stools or seats and can levitate potential occupant away from wet surfaces, insects and debris associated with outdoor foliage. Unique difference being the ability and recommendation to secure product to horizontal and or vertical supports expanding application vastly over the limited vertical trunk to the entire canopy. In addition to the previous, product is almost invisible when not occupied to hinder theft which is a real problem in isolated locations and can easily be out fitted with a bicycle lock to secure the lounge seat to permanent sturdy branches.

BRIEF DESCRIPTION OF THE SEVERAL VIEWS OF THE DRAWING(S)

FIG. 1 Overall view of entire product including all moving parts in a static assembled posture including tie lines that are detached for transport.

Figure 2:
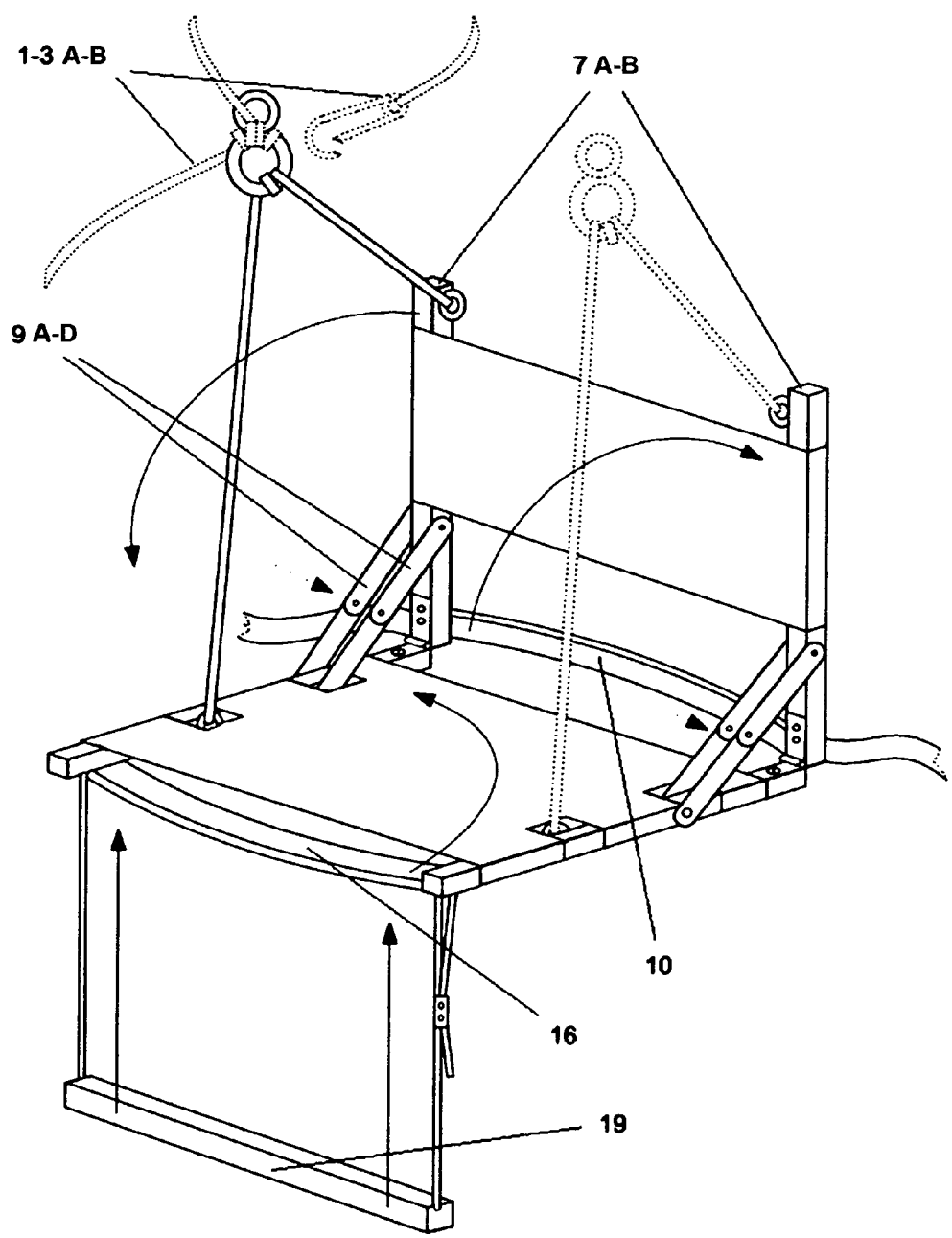

FIG. 2 Overall view of entire product showing moving parts for folding procedure and travel, said product will easily collapse into a 24"×5" cylinder for insertion into tote bag.

Figure 3:
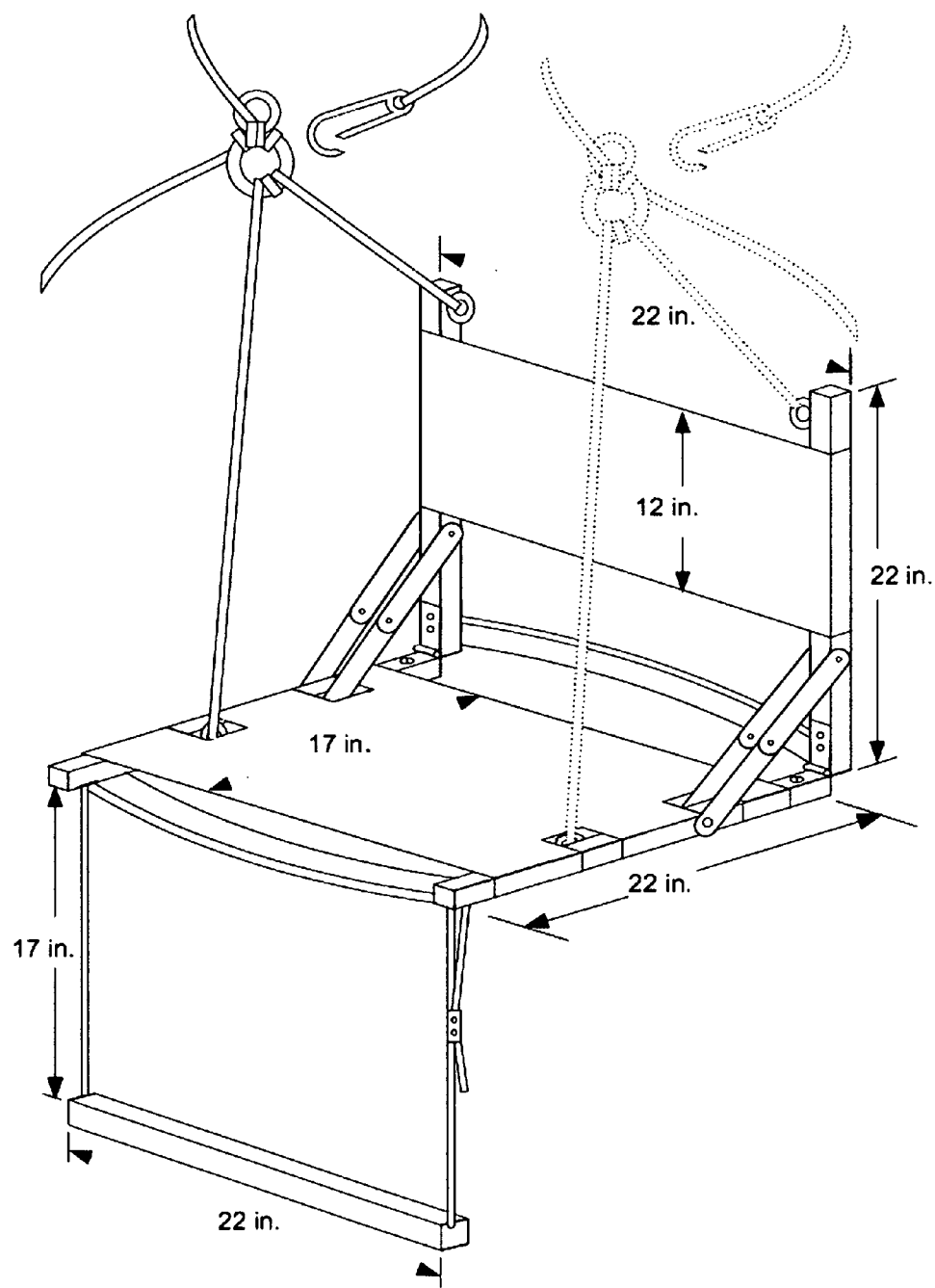

FIG. 3. Overall view with dimensions to specify the physical presence of said product or

DETAILED DESCRIPTION OF THE INVENTION

Referring to FIG. 1; once L-frame is assembled, tie lines 1A-B are woven, tossed or inserted between and or over branches and returned to apparatus with weighted Carabiner clip where it is secured to hardware element known as a "Belay Device" shaped identical to the "numeral 8". This device will be referred to as the Belay Device through out this detailed description. Designation of (A-B) referring to mirrored, dual or left and right hardware elements throughout invention description. 2A-B, 3A-B is the opposing line(s) of the line designated by 1A-B as shown in FIG. 1. 4A-B, large Belay Device climbing rings device is suitable to secure loose and/or slack line at any midpoint location and does not require a tie line termination or end point. Element 5A-B is a permanent static line suspended from mounted "eye bolt" 6A-B to eye bolt 13A-B and is duplicated or mirrored for support on both left and right as frame supports to suspend total occupant weight at any level. Said line easily adjusts the pitch of the seat via loops thru Belay Device hardware element to accommodate a level horizontal seat plain or a more reclined angle for comfort. 7A-B aluminum square tubing are vertical frame supports permanently attached to hinge 11A-B, swinging flat bar or horizontal brace 10 for transport. and eye bolts 6A-B. 12 is a standard seat belt or safety belt for added security with traditional adjustable clasp and/or belt loop or buckle.

FIG. 2; 9(A thru D), are "collapsable hinge supports" which push downward eventually paralleling aluminum framing 7A-B and 15A-B. Said "collapsable hinge supports" push downward while displacing 14 mesh fabric which is slack, pliable and offers little resistance once braces 10 and 16 are released and swung to storage positions, said components pivot to parallel with L-frame(s). 15A-B, horizontal aluminum tubing is mirror image of previously mention vertical tubing frames, with the exception of eyebolt placement 13A-B. 8 is stitched mesh fabric "back rest" sewn with continuous loop around frame 7A-B, as is 14 stitched nylon mesh fabric "seat" also sewn with left and right loops to thread horizontal frames. Seat fabric differs due to pattern cut outs to allow for 9, 13 hardware and 5 tie line. Cut out pattern mirror's left and right. 17 sash cord attached under frame utilizing simple bolt to synch allows 19 foot rest to be placed at optimum position and height level for added comfort with 18 line adjustment clasp or grip fastener.

FIG. 3; simple physical dimension perspective with fully locked and assembled lounge seat sling suspended below phantom natural structure or horizontal supports. Seat belt 12 pictured utilizing simple existing design, pictured in FIG. 1 and FIG. 2 is omitted in FIG. 3. to expose dimension detail.

The invention claimed is:

1. A tree lounge seat, comprising:
a first collapsible L-shaped side frame and a second collapsible L-shaped side frame defining laterally outer sides of the tree lounge seat, wherein each of the first and second L-shaped frames comprises a backrest portion and a seat portion;
first and second continuous, one-piece lines each having a first end and a second end, the first end of each line attached respectively to each of the backrest portions and the second end of each line attached respectively to each of the seat portions, wherein an intermediate portion of each of the first and second lines is configured to form an apex for suspended support of the collapsible L-shaped frame;
first and second figure "8" rings each adjustably engaged on a respective one of the intermediate portions of the lines for selectively adjusting a position of the apex such that a reclination of the tree lounge seat can be adjusted, wherein the figure "8" rings are each adapted to be adjustably secured to respective third and fourth lines that can be looped over or otherwise secured to one or more branches of a tree or other object for suspending the tree lounge seat from the tree or other object.

2. The tree lounge seat of claim 1, further comprising first and second hinges interconnecting the backrest portion to the seat portion on respective ones of the first and second L-shaped frames.

3. The tree lounge seat of claim 2, further comprising at least first and second collapsible hinge supports interconnecting the backrest portion and the seat portion of respective ones of the L-shaped frames to limit an open angle of the backrest portion relative to the seat portion in a deployed configuration, wherein the first and second hinges and the first and second collapsible hinge supports are configured to fold together simultaneously with folding of the first and second backrest portions relative to the first and second seat portions to a dismantled configuration.

4. The tree lounge seat of claim 3, wherein the backrest portions fold flat onto the seat portions in the dismantled configuration.

5. The tree lounge seat of claim 1, further comprising a footrest suspended from first and second seat portions by an adjustable sash cord.

6. The tree lounge seat of claim 1, further comprising a first brace rotatably coupled to the first seat portion and removably attached to the second seat portion for holding the first and second seat portions at a predetermined distance in a deployed configuration.

7. The tree lounge seat of claim 6, wherein the first brace is rotated to a position parallel to the first seat portion in a dismantled configuration.

8. The tree lounge seat of claim 1, further comprising a second brace removably coupled to the first backrest portion and rotatably attached to the second backrest portion for holding the first and second backrest portions at a predetermined distance in a deployed configuration.

9. The tree lounge seat of claim 8, wherein the second brace is rotated to a position parallel to the second backrest portion in a dismantled configuration.

10. The tree lounge seat of claim 1, further comprising a fabric backrest attached to and interconnecting the first and second backrest portions, and a fabric seat attached to and interconnecting the first and second seat portions.

11. A tree lounge seat, comprising:
a first collapsible L-shaped side frame and a second collapsible L-shaped side frame defining laterally outer sides of the tree lounge seat, wherein each of the first and second L-shaped frames comprises a backrest portion having at least one backrest eye bolt with an eye portion protruding laterally inward and a seat portion having at least one seat eye bolt with an eye portion protruding laterally inward;
at least first and second lines each having a first end and a second end, the first end of each line attached respectively to the eye portion of respective backrest eye bolts on each of the backrest portions and the second end of each line attached respectively to the eye portion of respective seat eye bolts on each of the seat portions;
first and second rings each engaged with intermediate portions between respective first and second ends of the first and second lines, respectively, to form an apex such that the tree lounge seat can be suspended at the apexes, wherein the rings are each adapted to be secured to respective third and fourth lines that can be looped over or otherwise secured to one or more branches of a tree or other object for suspending the tree lounge seat from the tree or other object.

12. The tree lounge seat of claim 11, further comprising first and second hinges interconnecting the backrest portion to the seat portion on respective ones of the first and second L-shaped frames.

13. The tree lounge seat of claim 12, further comprising at least first and second collapsible hinge supports interconnecting the backrest portion and the seat portion of respective ones of the L-shaped frames to limit an open angle of the backrest portion relative to the seat portion in a deployed configuration, wherein the first and second hinges and the first and second collapsible hinge supports are configured to fold together simultaneously with folding of the first and second backrest portions relative to the first and second seat portions to a dismantled configuration.

14. The tree lounge seat of claim 13, wherein the backrest portions fold flat onto the seat portions in the dismantled configuration.

15. The tree lounge seat of claim 11, further comprising a footrest suspended from first and second seat portions by an adjustable sash cord.

16. The tree lounge seat of claim 11, further comprising a first brace rotatably coupled to the first seat portion and removably attached to the second seat portion for holding the first and second seat portions at a predetermined distance in a deployed configuration.

17. The tree lounge seat of claim 16, wherein the first brace is rotated to a position parallel to the first seat portion in a dismantled configuration.

18. The tree lounge seat of claim 11, further comprising a second brace removably coupled to the first backrest portion and rotatably attached to the second backrest portion for holding the first and second backrest portions at a predetermined distance in a deployed configuration.

19. The tree lounge seat of claim 18, wherein the second brace is rotated to a position parallel to the second backrest portion in a dismantled configuration.

20. The tree lounge seat of claim 11, further comprising a fabric backrest attached to and interconnecting the first and second backrest portions, and a fabric seat attached to and interconnecting the first and second seat portions.

* * * * *